United States Patent [19]
Tanaka et al.

[11] Patent Number: 5,760,966
[45] Date of Patent: Jun. 2, 1998

[54] ZOOM LENS

[75] Inventors: Takashi Tanaka; Satoshi Yahagi, both of Omiya, Japan

[73] Assignee: Fuji Photo Optical Co., Ltd., Omiya, Japan

[21] Appl. No.: 621,947

[22] Filed: Mar. 25, 1996

[30] Foreign Application Priority Data

Jun. 19, 1995 [JP] Japan ................................. 7-175379

[51] Int. Cl.$^6$ ................................................. G02B 15/14
[52] U.S. Cl. ........................... 359/683; 359/676; 359/684
[58] Field of Search .................................. 359/683, 676, 359/766, 682, 681, 684, 685

[56] References Cited

U.S. PATENT DOCUMENTS 4,189,213  2/1980  Iizuka ................................. 359/683
5,585,969  12/1996  Endo ................................. 359/683

FOREIGN PATENT DOCUMENTS 3-158813 A  7/1991  Japan .

Primary Examiner—David C. Nelms
Assistant Examiner—Jordan M. Schwartz
Attorney, Agent, or Firm—Ronald R. Snider

[57] ABSTRACT

In five constituent lens groups, the fourth lens group from the object side is made as a negative lens. This fourth lens group is moved in order to correct zooming and focusing, while predetermined conditional expressions are satisfied, thereby yielding a zoom lens which can attain a wide angle, a large zoom ratio, and favorable aberrations. This zoom lens has five groups respectively composed of positive, negative, positive, negative, and positive lens groups. At the time of zooming, the first, third, and fifth lens groups G1, G3, and G5 are fixed, while the second and fourth lens groups G2 and G4 are made movable. As the second lens group G2 is moved in the optical axis direction, the focal length of the whole system is changed. As the fourth lens group G4 is moved in the optical axis direction, fluctuation in imaging position is corrected while change in the imaging position due to change in object distance is corrected. This zoom lens is further configured so as to satisfy the following conditional expressions (1) to (3):

$$0.9 < f_{w(3+4)}/(f_w \cdot f_t)^{1/2} < 1.3 \quad (1)$$

$$0.9 < f_5/(f_w \cdot f_t)^{1/2} < 1.1 \quad (2)$$

$$0.3 < |f_2|/(f_w \cdot f_t)^{1/2} < 0.4 \quad (3)$$

wherein $f_{w(3+4)}$ is combined focal length of the third and fourth lens groups at a wide angle end thereof, $f_w$ is focal length of said zoom lens as a whole system at the wide angle end, $f_t$ is focal length of said zoom lens as a whole at a telephotographic end thereof, $f_5$ is focal length of the fifth lens group, and $f_2$ is focal length of the second lens group.

4 Claims, 11 Drawing Sheets

FIG. 3D MIDDLE

FIG. 3E MIDDLE

FIG. 3F MIDDLE

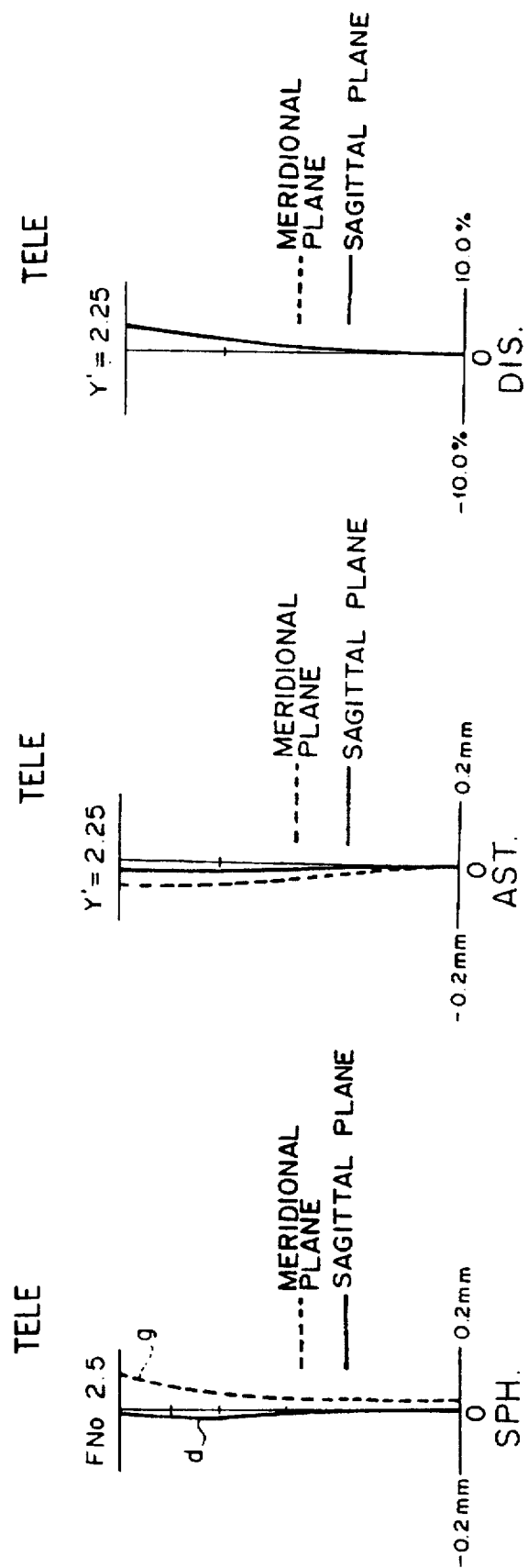

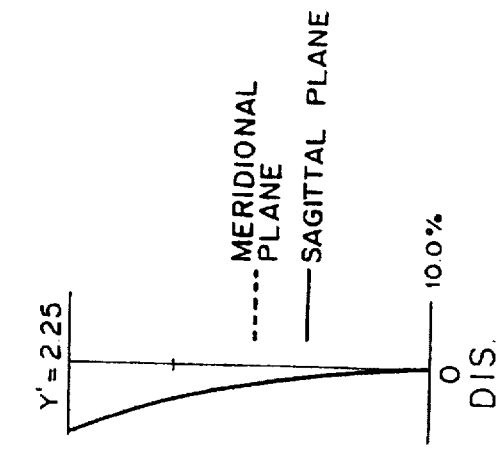
FIG. 4A WIDE — SPH.
FIG. 4B WIDE — AST.
FIG. 4C WIDE — DIS.

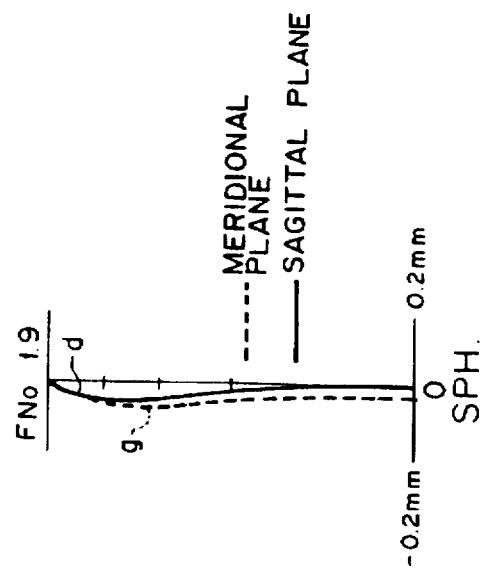

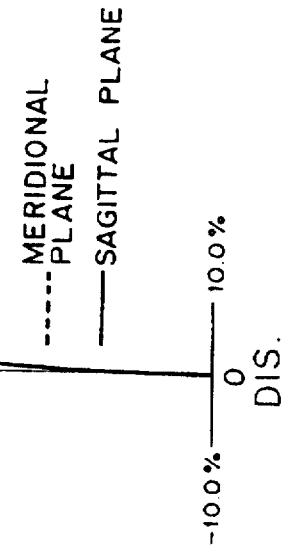
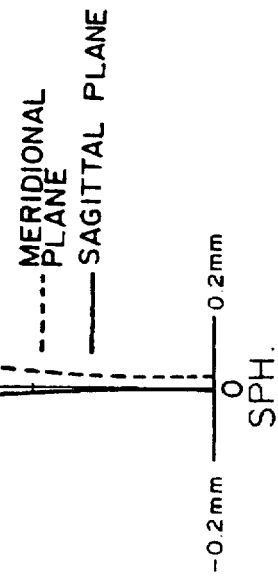
FIG. 4G TELE  FIG. 4H TELE  FIG. 4I TELE

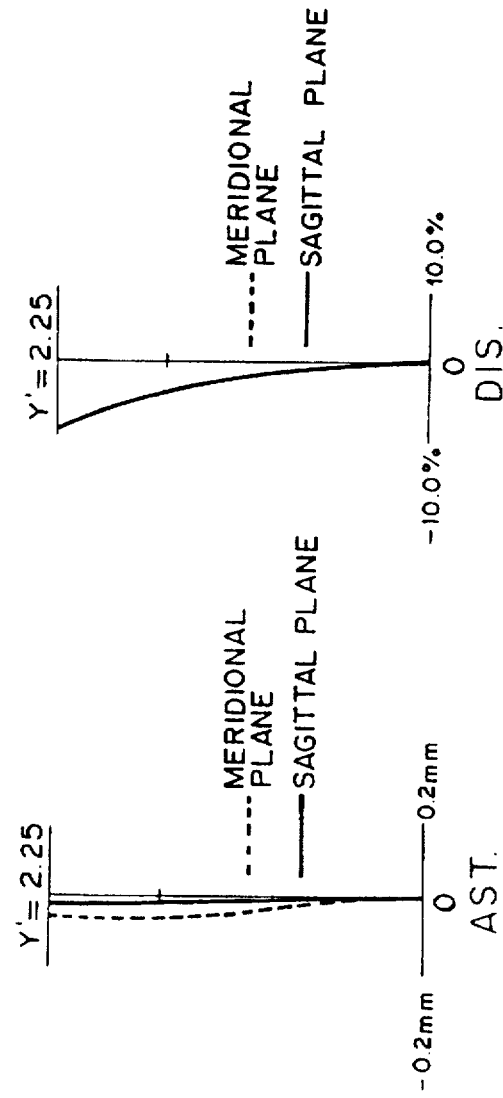
FIG. 5A WIDE
FIG. 5B WIDE
FIG. 5C WIDE

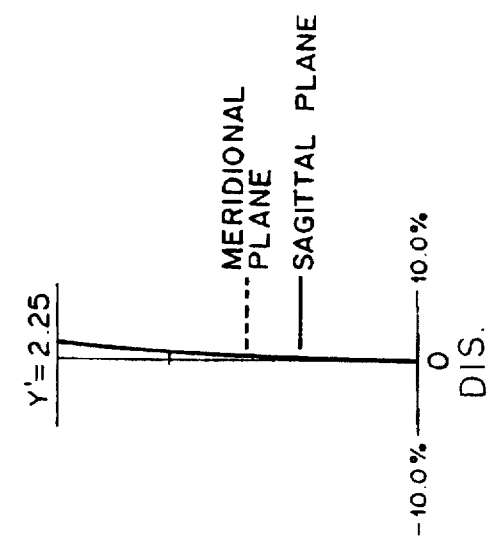
FIG. 5F MIDDLE
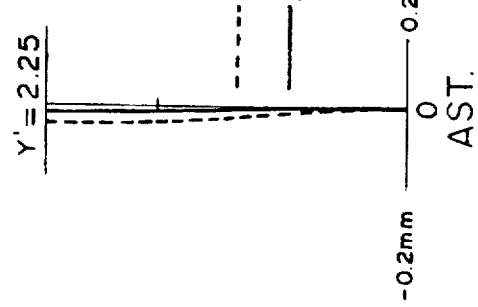
FIG. 5E MIDDLE
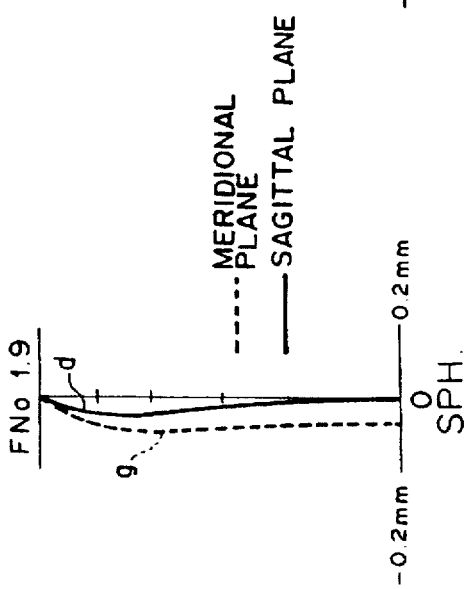
FIG. 5D MIDDLE

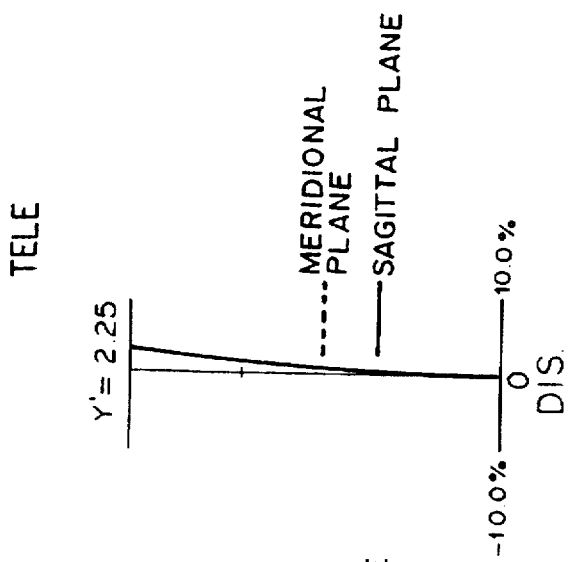
FIG. 5I TELE
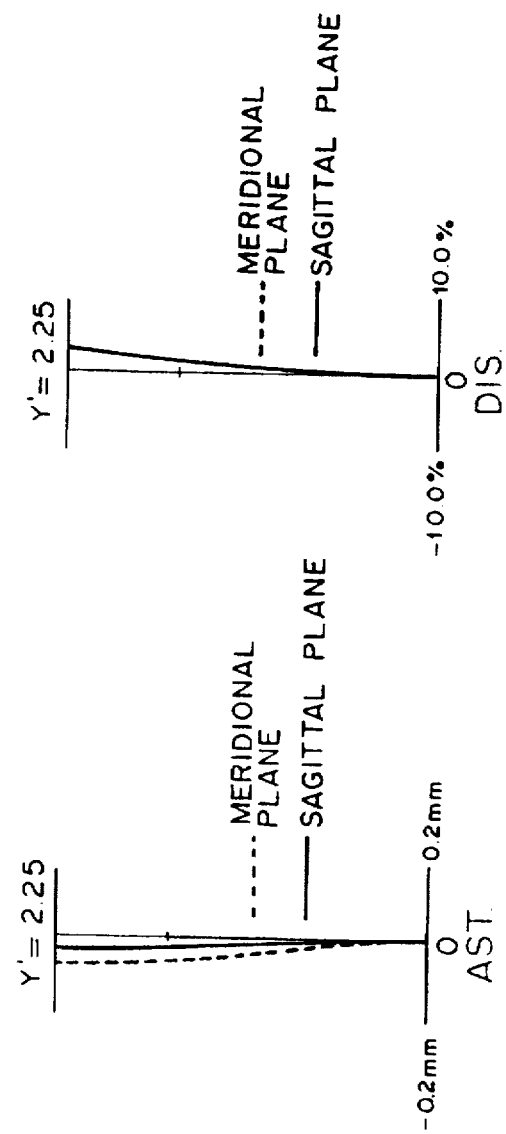
FIG. 5H TELE
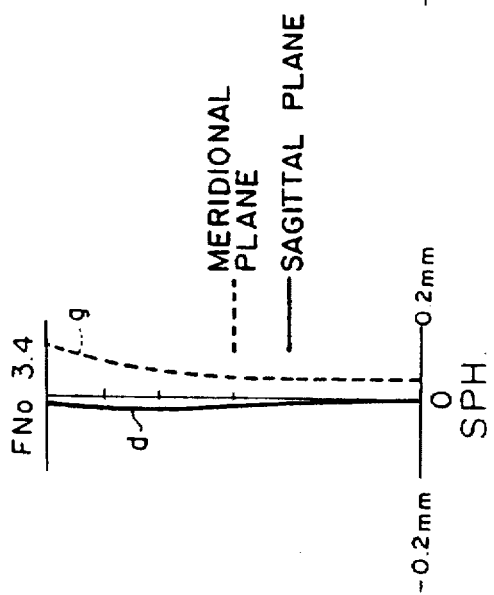
FIG. 5G TELE

ZOOM LENS

RELATED APPLICATIONS

This application claims the priority of Japanese Patent Application No. 7-175379 filed on Jun. 19, 1995, which is incorporated herein by reference.

BACKGROUND OF THE INVENTION

1. Field of the Invention

The present invention relates to a zoom lens and, in particular, to a zoom lens having a wide angle and a large variable power ratio used in home video camera and electronic still camera, for example.

2. Description of the Prior Art

The image pickup size of zoom lenses for video camera has been shifting from ⅓ inch to ¼ inch, thereby necessitating simplification of their lens configuration. As such a zoom lens, there has been known, for example, a lens with its whole system composed of four groups in which, while the first and third lens groups are fixed, the second lens group is moved in the optical axis direction so as to attain a variable power and its accompanying movement of the image point position is effected by the fourth lens group, thereby satisfying a condition where F number is 1.6 to 1.8 and zoom ratio is 8 to 12 times.

However, in the foregoing prior art, the fourth lens group moves so as to draw a curve protruded toward the object side within the range from its wide angle side to telephotographic side while, in its intermediate region, moving toward the third lens group. Since a luminous flux directed toward the peripheral portion of the image is emitted from a relatively low position of the fourth lens group in this intermediate region, the condition of aberration may different from that in the wide angle or telephotographic side, thereby making it difficult to minimize the fluctuation in aberration in the whole zoom area.

In particular, when the focal length on the wide angle side is to be further decreased, the refractive power of the fourth lens group has to be increased. While it is advantageous in that the moving distance of the fourth lens group is decreased and thereby the lens as a whole can have a smaller size, the fluctuation in aberration upon movement may become greater in proportion to the increase in the refractive power, thereby making it more difficult to correct aberration in the whole zoom area.

Further, there has recently been a strong demand for attaining a larger zoom ratio, for example, a zoom ratio of about 20 times or more. However, when the zoom ratio is increased to such an extent, the amount of movement of the fourth lens group has to be increased as that of the second lens group increases. As the fluctuation in aberration consequently increases, it becomes further difficult to effect correction in the whole zoom area.

Accordingly, in the above-mentioned configuration, the angle of view has been limited to about 58 degrees or smaller, while the zoom ratio has been limited to about 12 times or smaller.

Also, in the various conventional techniques known heretofore, since the number of lens sheets constituting the zoom lens has been increased nearly to the limit for satisfying the foregoing conditions, it has been difficult to attain a higher zoom ratio while maintaining its performances as they are.

SUMMARY OF THE INVENTION

The object of the present invention is to provide a zoom lens having a wider angle, a larger zoom ratio, and better aberrations than the prior art.

The zoom lens in accordance with the present invention comprises, successively from the object side, a first lens group having a positive refractive power, a second lens group having a negative refractive power, a third lens group having a positive refractive power, a fourth lens group having a negative refractive power, and a fifth lens group having a positive refractive power.

At the time of zooming, the first lens group, the third lens group, and the fifth lens group are fixed, while the second lens group and the fourth lens group are made movable.

As the second lens group is moved in the optical axis direction, the focal length of the whole system is changed. As the fourth lens group is moved in the optical axis direction, fluctuation in imaging position is corrected while change in the imaging position due to change in object distance is corrected. This zoom lens is further configured so as to satisfy the following conditional expressions (1) to (3):

$$0.9 < f_{w(3+4)}/(f_w \cdot f_t)^{1/2} < 1.3 \tag{1}$$

$$0.9 < f_5/(f_w \cdot f_t)^{1/2} < 1.1 \tag{2}$$

$$0.3 < |f_2|/(f_w \cdot f_t)^{1/2} < 0.4 \tag{3}$$

wherein $f_{w(3+4)}$ is the combined focal length of the third and fourth lens groups at the wide angle end, $f_w$ is the focal length of the whole system at the wide angle end, $f_t$ is the focal length of the whole system at the telephotographic end, $f_5$ is the focal length of the fifth lens group, and $f_2$ is the focal length of the second lens group.

Preferably, at least one lens comprised within the third lens group has a positive refractive power and satisfies the following conditional expressions (4) and (5):

$$v_d > 80 \tag{4}$$

$$\theta_{g, F} > 0.53 \tag{5}$$

wherein $v_d$ is Abbe number at d-line and $\theta_{g, F}$ is relative partial dispersion:

$$(n_g - n_F)/(n_F - n_c)$$

Also, preferably, at least one lens comprised within the fifth lens group has a positive refractive power and satisfies the following conditional expressions (6) and (7):

$$v_d > 65 \tag{6}$$

$$\theta_{g, F} > 0.53 \tag{7}$$

wherein $v_d$ is Abbe number at d-line and $\theta_{g, F}$ is relative partial dispersion:

$$(n_g - n_F)/(n_F - n_c)$$

when $n_g$, $n_F$, and $n_c$ are the indices for the g, F, and c lines.

Further, preferably, at least one lens surface of a lens comprised within the third lens group is formed of an aspheric surface.

According to these configurations, in the present invention, the problems of the prior art are overcome. As the fifth lens group is constituted by the lens group having a positive refractive power which is fixed at the time of variable magnification, a wider angle is attained without increasing the refractive power of the fourth lens group, while minimizing the fluctuation in aberration due to the variable magnification. Accordingly, a zoom lens having a wider angle and a larger zoom ratio can be realized.

In order to attain a focal length enabling a wider angle and to perform better correction of aberration in the whole zoom area, a larger amount of correction has to be effected on the lens surface as the emitted light ray is farther from the optical axis. Accordingly, the fifth lens group which is fixed at the time of variable magnification is placed at the position, in the lens system, closest to the image.

In the following, the above-mentioned conditional expressions defining the refractive powers of the second, third, fourth, and fifth lens groups will be explained.

Conditional expression (1) defines the range of the refractive power needed for the third and fourth lens groups to increase the angle of view at the wide angle end. It is necessary for realizing a wider angle while effecting favorable correction of aberration in the whole variable magnification area.

Above the upper limit of conditional expression (1), the tilt of the image surface may be corrected in excess, thereby making it difficult to balance with spherical aberration.

By contrast, below the lower limit of conditional expression (1), it becomes difficult to realize a wider angle.

Like conditional expression (1), conditional expression (2) defines the range of the refractive power needed for the fifth lens group to increase the angle of view at the wide angle end.

Namely, below the lower limit of conditional expression (2), a wider angle cannot be realized.

By contrast, above the upper limit of conditional expression (2), the image surface may tilt toward the object while the outer diameter of the first lens group may increase, thereby making it difficult for the whole lens system to attain a compact size.

Conditional expression (3) defines the range of the refractive power needed for the second lens group to increase the zoom ratio.

Namely, below the lower limit of conditional expression (3), the amount of fluctuation in aberration becomes so large that a favorable performance may be hard to attain.

By contrast, above the upper limit of conditional expression (3), the amount of movement at the time of variable magnification becomes so large that it may be difficult for the whole lens system to attain a compact size.

Conditional expressions (4), (5), (6), and (7) are conditional expressions for favorably correcting the whole chromatic aberration.

In particular, for the respective lenses, conditional expressions (4) and (5) are conditions necessary for correcting axial chromatic aberration, while conditional expressions (6) and (7) are conditions necessary for correcting chromatic aberration of magnification. These conditional expressions are satisfied by glass materials having so-called anomalous dispersion.

In order to correct chromatic aberration, so-called achromatic lens in which lenses having Abbe numbers greatly different from each other are combined together has been needed to be introduced. When the zoom ratio is to be increased in this case, however, chromatic aberration of the whole system becomes harder to correct. In particular, it becomes difficult to correct the secondary spectrum.

Accordingly, the use of a glass material having anomalous dispersion is quite effective for correcting chromatic aberration.

As mentioned above, the range defined by conditional expressions (4), (5), (6), and (7) is a range where the glass having anomalous dispersion exists. When other glass materials are used, it becomes difficult to achieve balanced correction of chromatic aberration in the whole zoom area.

Further, when at least one lens surface in the third lens group is made aspherical, the number of lenses in the whole lens system can be reduced, while attaining favorable correction of aberration, in particular, such as spherical aberration. Namely, when all the lens surfaces are constituted by spherical surfaces, the number of lenses has to be increased in order to attain favorable correction of aberration. It is unfavorable since the whole length of the lens system increases thereby.

BRIEF DESCRIPTION OF THE DRAWINGS

FIG. 4 is aberration charts showing various aberrations of a zoom lens in accordance with a second embodiment at its wide angle end (A–C), intermediate position (D–F), and telephotographic end (G–I), respectively; and FIG. 5 is aberration charts showing various aberrations of a zoom lens in accordance with a third embodiment at its wide angle end (A–C), intermediate position (D–F), and telephotographic end (G–I), respectively.

DETAILED DESCRIPTION OF THE PREFERRED EMBODIMENTS

In the following, a zoom lens in an embodiment of the present invention will be explained with reference to drawings.

Figure 1:
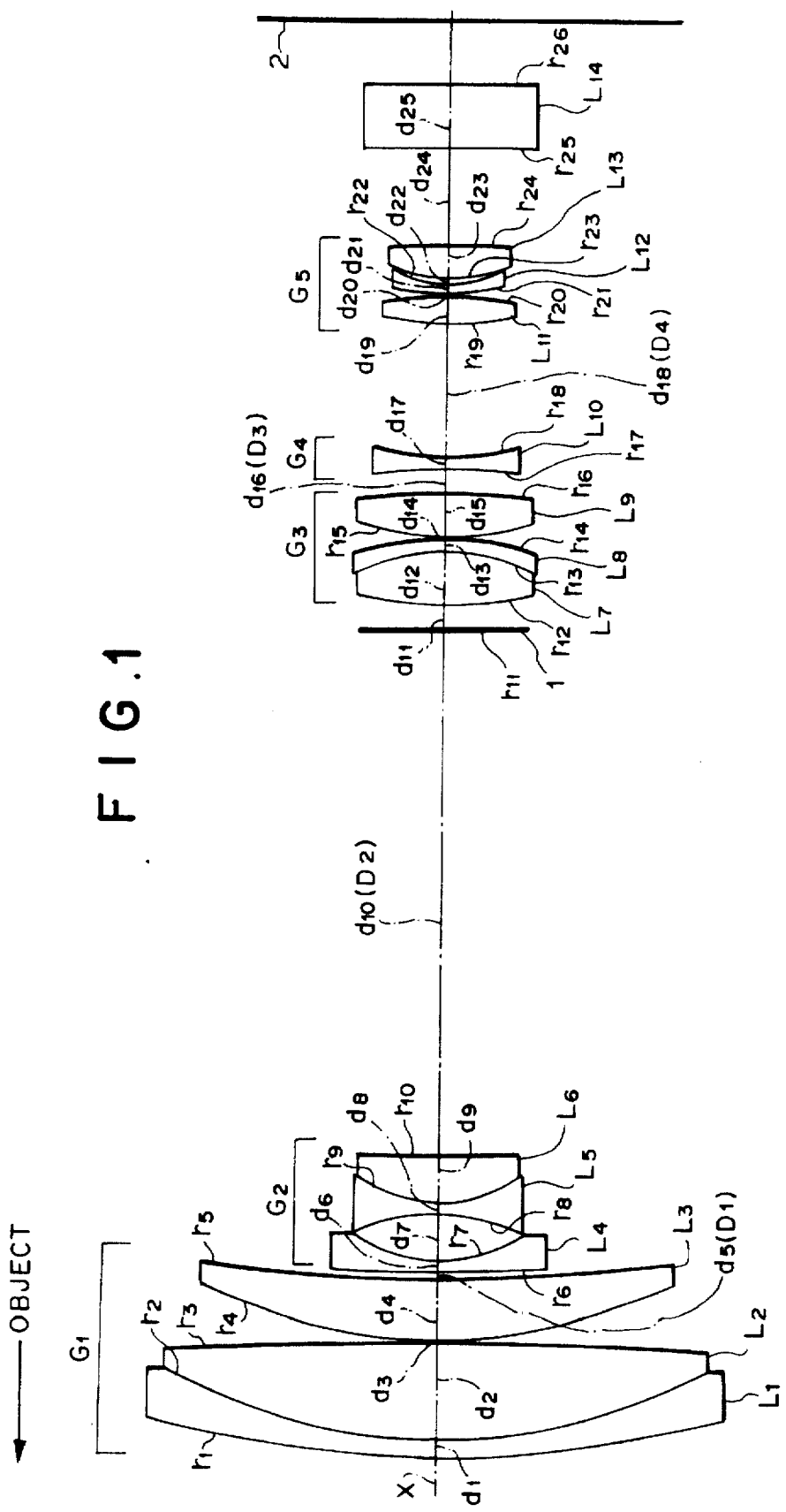
FIG. 1 is a diagram showing a lens configuration of a zoom lens in an embodiment of the present invention at its wide angle end.
Figure 2:
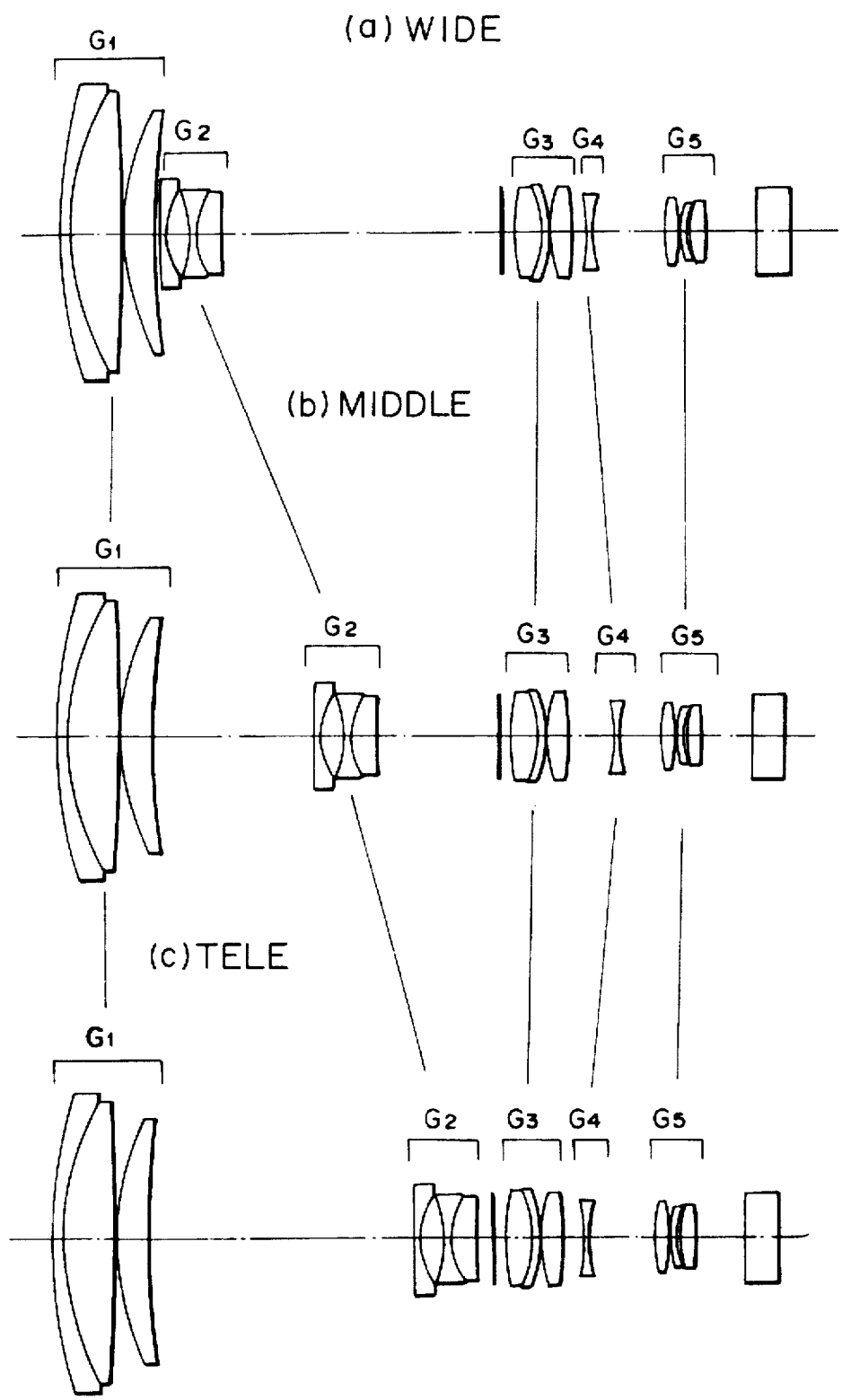
FIG. 2 is diagrams showing positional relationships of lens groups in a zoom lens in an embodiment of the present invention at its wide angle end (a), intermediate position (b), and telephotographic end (c), respectively.

FIG. 1 is a lens configuration diagram showing configurations of first to third embodiments of the zoom lens in accordance with the present invention. FIG. 2 is diagrams showing positional relationships of lens groups in the zoom lens at its wide angle end (a), intermediate position (b), and telephotographic end (c), respectively.

The depicted zoom lens comprises, successively from the object side, a first lens group G1 having a positive refractive power, a second lens group G2 having a negative refractive power, a stop 1, a third lens group G3 having a positive refractive power, a fourth lens group G4 having a negative refractive power, and a fifth lens group G5 having a positive refractive power. At the time of zooming, the first lens group G1, the third lens group G3, and the fifth lens group G5 are fixed, while the second lens group G2 and the fourth lens group G4 are made movable. As the second lens group G2 is moved along an optical axis X, focal length f of the whole system is changed. As the fourth lens group G4 is moved along the optical axis X, focusing is effected while correcting the fluctuation in imaging position caused by the movement of the second lens group G2. This zoom lens is further configured so as to satisfy the following conditional expressions (1) to (3):

$$0.9 < f_{w(3+4)}/(f_w \cdot f_t)^{1/2} < 1.3 \tag{1}$$

$$0.9 < f_5/(f_w \cdot f_t)^{1/2} < 1.1 \tag{2}$$

$$0.3 < |f_2|/(f_w \cdot f_t)^{1/2} < 0.4 \quad (3)$$

wherein $f_{w(3+4)}$ is the combined focal length of the third and fourth lens groups at the wide angle end, $f_w$ is the focal length of the whole system at the wide angle end, $f_t$ is the focal length of the whole system at the telephotographic end, $f_5$ is the focal length of the fifth lens group, and $f_2$ is the focal length of the second lens group.

More specifically, the first lens group G1 is constituted by lenses $L_1$ to $L_3$, the second lens group G2 is constituted by lenses $L_4$ to $L_6$, the third lens group G3 is constituted by lenses $L_7$ and $L_8$ and a lens $L_9$ whose front surface (surface facing the object) is made aspherical, the fourth lens group G4 is constituted by a single lens $L_{10}$, and the fifth lens group G5 is constituted by lenses $L_{11}$ to $L_{13}$.

Also, between the fifth lens group G5 and an imaging surface 2, a low-pass filter $L_{14}$ for cutting infrared light is disposed.

In the following, each embodiment will be explained in detail.

First, for the zoom lens in accordance with the first embodiment, radius of curvature r (mm) of each lens surface, central thickness of each lens and air space between neighboring lenses (collectively referred to as "axial spacing" hereinafter) d (mm), and refractive index N and Abbe number ν of each lens at d-line are listed in the following Table 1.

The numbers in this table indicate the successive positions counted from the object side. In the column for radius of curvature r, "Aspheric surface" indicates (as in the cases of the following Tables 3 and 5) that it is an aspheric form computed by the following equation (A):

$$Z = CY^2/\{1+(1-KC^2Y^2)^{1/2}\} + A_1Y^4 + A_2Y^6 + A_3Y^8 + A_4Y^{10} \quad (A)$$

wherein Z is the length (mm) of a perpendicular drawn from a point on the aspheric surface having a height Y from the optical axis to a tangential plane (plane perpendicular to the optical axis) of the apex of the aspheric surface, C is the paraxial curvature of the aspheric surface, Y is the height (mm) from the optical axis, K is the eccentricity, and $A_1$ to $A_4$ are aspherical coefficients of the fourth, sixth, eighth, and tenth orders.

Also, the following Table 2 shows values of $D_1$, $D_2$, $D_3$, and $D_4$ in the column for axial spacing d in Table 1 at their wide angle, intermediate, and telephotographic end positions. Further, the lower portion of Table 2 indicates focal length f of the whole system, F number ($F_{NO}$), angle of view 2 ω, and values of the respective constants C, K, and $A_1$ to $A_4$ of the aspheric surface indicated by the above-mentioned equation (A).

TABLE 1

| m | r | d | N | ν |
|---|---|---|---|---|
| 1 | 60.466 | 1.10 | 1.84666 | 23.8 |
| 2 | 31.632 | 5.91 | 1.62299 | 58.1 |
| 3 | −307.288 | 0.10 | | |
| 4 | 30.390 | 3.60 | 1.62299 | 58.1 |
| 5 | 97.910 | $D_1$ | | |
| 6 | 150.000 | 0.62 | 1.72000 | 50.3 |
| 7 | 8.243 | 2.82 | | |
| 8 | −12.211 | 0.61 | 1.72000 | 50.3 |
| 9 | 7.510 | 2.85 | 1.78471 | 25.7 |
| 10 | 88.168 | $D_2$ | | |
| 11 | Stop | 1.40 | | |
| 12 | 24.747 | 3.13 | 1.49700 | 81.6 |

TABLE 1-continued

| m | r | d | N | ν |
|---|---|---|---|---|
| 13 | −10.772 | 0.75 | 1.78471 | 25.7 |
| 14 | −16.894 | 0.10 | | |
| 15 | Aspheric surface | 2.60 | 1.58913 | 61.2 |
| 16 | −39.581 | $D_3$ | | |
| 17 | −33.336 | 0.55 | 1.62041 | 60.3 |
| 18 | 14.991 | $D_4$ | | |
| 19 | 19.077 | 1.70 | 1.65844 | 50.8 |
| 20 | −20.501 | 0.10 | | |
| 21 | 18.634 | 0.55 | 1.80609 | 33.3 |
| 22 | 6.194 | 0.26 | | |
| 23 | 8.150 | 1.98 | 1.56907 | 71.3 |
| 24 | −58.253 | 1.00 | | |
| 25 | 0.0 | 3.69 | 1.51633 | 64.0 |
| 26 | 0.0 | | | |

TABLE 2

| Group spacing | Wide angle end | Intermediate | Telephotographic end |
|---|---|---|---|
| $D_1$ | 0.50 | 18.09 | 29.74 |
| $D_2$ | 31.19 | 13.60 | 1.95 |
| $D_3$ | 1.53 | 4.94 | 2.14 |
| $D_4$ | 8.06 | 4.65 | 7.45 |

Figures 3A, 3B, 3C:
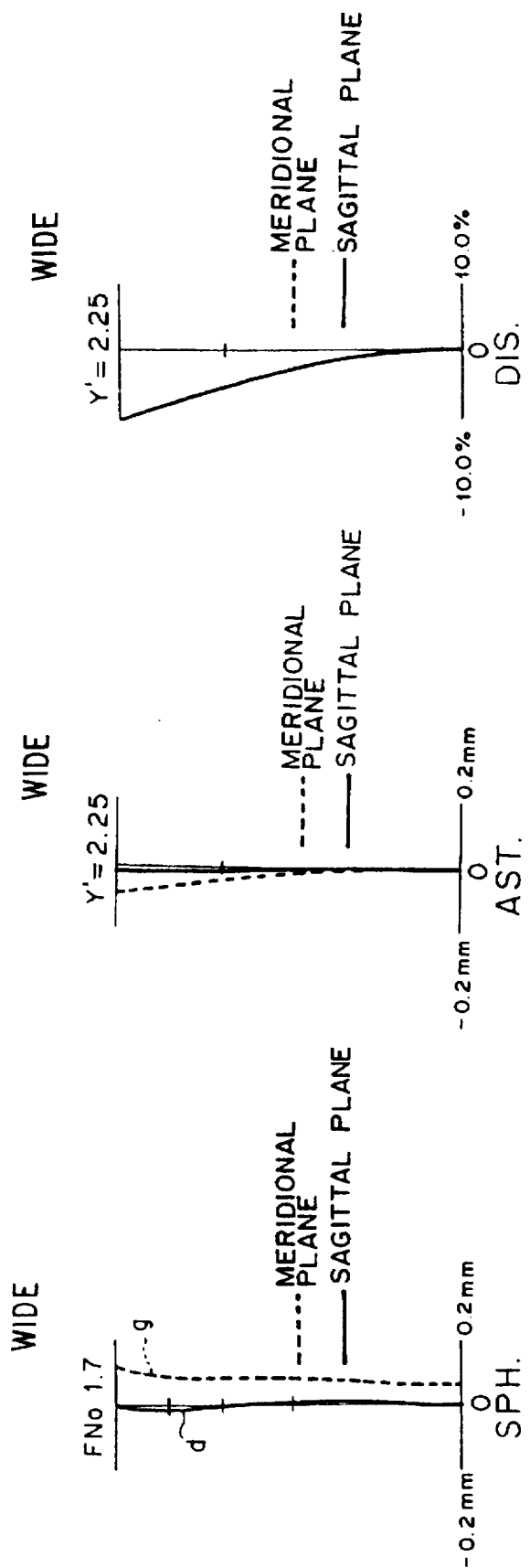
FIG. 3 is aberration charts showing various aberrations of a zoom lens in accordance with a first embodiment at its wide angle end (A–C), intermediate position (D–F), and telephotographic end (G–I), respectively.
Figures 3D, 3E, 3F:
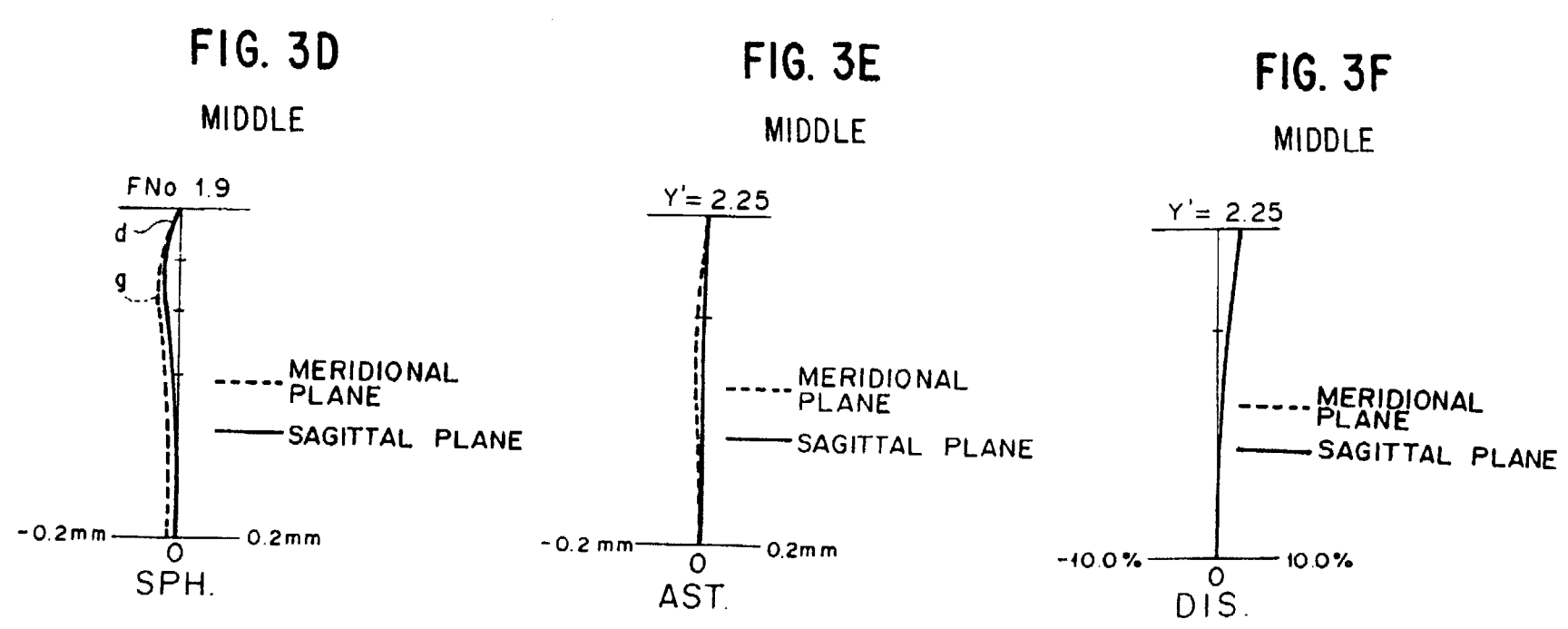

$f = 3.53$–$79.65$  $C = 6.647255 \times 10^{-2}$
$F_{NO} = 1.68$–$2.45$  $K = -3.946435$
$2\omega = 70.9°$–$3.1°$  $A_1 = 1.021714 \times 10^{-4}$
  $A_2 = -1.093433 \times 10^{-6}$
  $A_3 = -6.955091 \times 10^{-10}$
  $A_4 = -2.446324 \times 10^{-11}$ FIG. 3 is aberration charts showing various aberrations of the zoom lens in accordance with the above-mentioned first embodiment at its wide angle end (A–C), intermediate position (D–F), and telephotographic end (G–I), respectively. As can be seen from these charts, in accordance with the zoom lens system of the first embodiment, favorable correction of aberrations can be effected in the whole zoom area, thereby attaining a wider angle (2 ω=70.9 degrees) and a high zoom ratio (22.6 times).

Next, for the zoom lens in accordance with the second embodiment, radius of curvature r (mm) of each lens surface, axial spacing d (mm), and refractive index N and Abbe number ν of each lens at d-line are listed in the following Table 3.

Also, the following Table 4 shows values of $D_1$, $D_2$, $D_3$, and $D_4$ in the column for axial spacing d in Table 3 at their wide angle, intermediate, and telephotographic end positions. Further, the lower portion of Table 4 indicates focal length f of the whole system, F number $F_{NO}$, angle of view 2 ω, and values of the respective constants C, K, and $A_1$ to $A_4$ of the aspheric surface indicated by the above-mentioned equation (A).

TABLE 3

| m | r | d | N | ν |
|---|---|---|---|---|
| 1 | 56.504 | 1.10 | 1.84666 | 23.8 |
| 2 | 30.528 | 5.25 | 1.62299 | 58.1 |
| 3 | −402.505 | 0.10 | | |
| 4 | 30.513 | 3.36 | 1.62299 | 58.1 |
| 5 | 99.820 | $D_1$ | | |
| 6 | 80.000 | 0.62 | 1.72000 | 50.3 |
| 7 | 8.592 | 2.69 | | |
| 8 | −12.066 | 0.61 | 1.72000 | 50.3 |
| 9 | 7.522 | 2.71 | 1.78471 | 25.7 |
| 10 | 54.540 | $D_2$ | | |

TABLE 3-continued

| m  | r               | d    | N       | v    |
|----|-----------------|------|---------|------|
| 11 | Stop            | 1.40 |         |      |
| 12 | 23.729          | 3.13 | 1.49700 | 81.6 |
| 13 | -11.076         | 0.75 | 1.78471 | 25.7 |
| 14 | -17.136         | 0.10 |         |      |
| 15 | Aspheric surface| 2.60 | 1.58913 | 61.2 |
| 16 | -42.741         | $D_3$|         |      |
| 17 | -37.542         | 0.55 | 1.62041 | 60.3 |
| 18 | 14.822          | $D_4$|         |      |
| 19 | 20.455          | 1.70 | 1.65844 | 50.8 |
| 20 | -20.980         | 0.10 |         |      |
| 21 | 20.219          | 0.55 | 1.80609 | 33.3 |
| 22 | 6.299           | 0.26 |         |      |
| 23 | 8.066           | 1.98 | 1.56907 | 71.3 |
| 24 | -52.335         | 1.00 |         |      |
| 25 | 0.0             | 3.69 | 1.51633 | 64.0 |
| 26 | 0.0             |      |         |      |

TABLE 4

| Group spacing | Wide angle end | Intermediate | Telephotographic end |
|---------------|----------------|--------------|----------------------|
| $D_1$         | 0.50           | 17.87        | 29.48                |
| $D_2$         | 30.93          | 13.56        | 1.95                 |
| $D_3$         | 1.69           | 5.28         | 1.58                 |
| $D_4$         | 8.32           | 4.73         | 8.43                 |

$f = 3.76$–$84.85$  
$F_{NO} = 1.68$–$2.84$  
$2\omega = 67.2°$–$2.9°$ $C = 6.540032 \times 10^{-2}$  
$K = -3.888957$  
$A_1 = 9.328906 \times 10^{-5}$  
$A_2 = -1.012362 \times 10^{-6}$  
$A_3 = 1.399403 \times 10^{-10}$  
$A_4 = -2.327075 \times 10^{-11}$ FIG. 4 is aberration charts showing various aberrations of the zoom lens in accordance with the above-mentioned second embodiment at its wide angle end (A–C), intermediate position (D–F), and telephotographic end (G–I), respectively. As can be seen from these charts, in accordance with the zoom lens system of the second embodiment, favorable correction of aberrations can be effected in the whole zoom area, thereby attaining a wider angle (2 ω=67.2 degrees) and a high zoom ratio (22.6 times).

Next, for the zoom lens in accordance with the third embodiment, radius of curvature r (mm) of each lens surface, axial spacing d (mm), and refractive index N and Abbe number v of each lens at d-line are listed in the following Table 5.

Also, the following Table 6 shows values of $D_1$, $D_2$, $D_3$, and $D_4$ in the column for axial spacing d in Table 5 at their wide angle, intermediate, and telephotographic end positions. Further, the lower portion of Table 6 indicates focal length f of the whole system, F number ($F_{NO}$), angle of view 2 ω, and values of the respective constants C, K, and $A_1$ to $A_4$ of the aspheric surface indicated by the above-mentioned equation (A).

TABLE 5

| m | r        | d    | N       | v    |
|---|----------|------|---------|------|
| 1 | 54.278   | 1.00 | 1.84666 | 23.8 |
| 2 | 29.854   | 4.45 | 1.62299 | 58.1 |
| 3 | -797.426 | 0.10 |         |      |
| 4 | 30.864   | 3.05 | 1.62299 | 58.1 |
| 5 | 104.568  | $D_1$|         |      |
| 6 | 34.965   | 0.62 | 1.72000 | 50.3 |
| 7 | 8.710    | 2.63 |         |      |
| 8 | -11.489  | 0.60 | 1.72000 | 50.3 |

TABLE 5-continued

| m  | r               | d    | N       | v    |
|----|-----------------|------|---------|------|
| 9  | 7.146           | 2.54 | 1.78471 | 25.7 |
| 10 | 35.974          | $D_2$|         |      |
| 11 | Stop            | 1.40 |         |      |
| 12 | 16.897          | 3.75 | 1.49700 | 81.6 |
| 13 | -11.908         | 0.85 | 1.78471 | 25.7 |
| 14 | -19.448         | 0.10 |         |      |
| 15 | Aspheric surface| 2.75 | 1.58913 | 61.2 |
| 16 | -36.295         | $D_3$|         |      |
| 17 | -46.557         | 0.60 | 1.62041 | 60.3 |
| 18 | 12.451          | $D_4$|         |      |
| 19 | 29.010          | 1.70 | 1.64850 | 53.0 |
| 20 | -18.719         | 0.10 |         |      |
| 21 | 34.902          | 0.55 | 1.80610 | 40.7 |
| 22 | 6.715           | 0.26 |         |      |
| 23 | 7.923           | 2.15 | 1.59240 | 68.3 |
| 24 | -30.544         | 1.00 |         |      |
| 25 | 0.0             | 3.69 | 1.51633 | 64.0 |
| 26 | 0.0             |      |         |      |

TABLE 6

| Group spacing | Wide angle end | Intermediate | Telephotographic end |
|---------------|----------------|--------------|----------------------|
| $D_1$         | 0.50           | 18.18        | 29.93                |
| $D_2$         | 31.38          | 13.70        | 1.95                 |
| $D_3$         | 1.88           | 5.35         | 1.55                 |
| $D_4$         | 8.00           | 4.53         | 8.33                 |

$f = 4.13$–$93.28$  
$F_{NO} = 1.69$–$3.40$  
$2\omega = 62.0°$–$2.7°$ $C = 5.947830 \times 10^{-2}$  
$K = -3.797077$  
$A_1 = 2.349963 \times 10^{-5}$  
$A_2 = -9.871715 \times 10^{-7}$  
$A_3 = 2.685512 \times 10^{-9}$  
$A_4 = -2.003012 \times 10^{-11}$ FIG. 5 is aberration charts showing various aberrations of the zoom lens in accordance with the above-mentioned third embodiment at its wide angle end (A–C), intermediate position (D–F), and telephotographic end (G–I), respectively. As can be seen from these charts, in accordance with the zoom lens system of the third embodiment, favorable correction of aberrations can be effected in the whole zoom area, thereby attaining a wider angle (2 ω=62.0 degrees) and a high zoom ratio (22.6 times).

The following Table 7 shows the value of $f_{w(3+4)}/(f_w \cdot f_t)^{1/2}$ in the above-mentioned conditional expression (1), value of $f_5/(f_w \cdot f_t)^{1/2}$ in the above-mentioned conditional expression (2), value of $|f_2|/(f_w \cdot f_t)^{1/2}$ in the above-mentioned conditional expression (3) in each of the above-mentioned embodiments.

TABLE 7

|                                      | Embodiment 1 | Embodiment 2 | Embodiment 3 |
|--------------------------------------|--------------|--------------|--------------|
| $f_{w(3+4)}/(f_w \cdot f_t)^{1/2}$   | 1.24         | 1.13         | 0.99         |
| $f_5/(f_w \cdot f_t)^{1/2}$          | 0.99         | 0.98         | 0.94         |
| $|f_2|/(f_2 \cdot f_t)^{1/2}$        | 0.38         | 0.36         | 0.33         |

As can be seen from Table 7, the zoom lens of each embodiment satisfies the above-mentioned conditional expressions (1), (2), and (3).

Also, as can be seen from the following Table 8 indicating relative partial dispersions and Abbe numbers of predetermined lenses in each embodiment, the zoom lens of each embodiment satisfies the above-mentioned conditional expressions (4), (5), and (6), thereby enabling favorable correction of chromatic aberration.

TABLE 8

| Lens | Embodiment 1 | | Embodiment 2 | | Embodiment 3 | |
|---|---|---|---|---|---|---|
| | $L_7$ | $L_{13}$ | $L_7$ | $L_{13}$ | $L_7$ | $L_{13}$ |
| Relative partial dispersion ($\theta_{g,F}$) | 0.54 | 0.55 | 0.54 | 0.55 | 0.54 | 0.55 |
| Abbe number ($\nu$) | 81.6 | 71.3 | 81.6 | 71.3 | 81.6 | 68.3 |

Without being restricted to the foregoing embodiments, the zoom lens of the present invention can be configured in various manners. For example, the number and form of lenses constituting each lens group can be selected appropriately.

As explained in the foregoing, the zoom lens of the present invention can attain a wide angle of view of about 60 to 70 degrees and a high zoom ratio of about 23 times, while favorably correcting various aberrations.

What is claimed is:

1. A zoom lens comprising, successively from an object side thereof, a first lens group having a positive refractive power, a second lens group having a negative refractive power, a third lens group having a positive refractive power, a fourth lens group having a negative refractive power, and a fifth lens group having a positive refractive power, wherein, upon zooming, said first lens group, said third lens group, and said fifth lens group are fixed, while said second lens group and said fourth lens group are made movable, wherein said second lens group is moved in an optical axis direction so as to change a focal length of said zoom lens as a whole system and said fourth lens group is moved in the optical axis direction so as to correct fluctuation in imaging position while correcting change in the imaging position caused by change in object distance, and wherein said zoom lens is configured so as to satisfy the following conditional expressions (1) to (3):

$$0.9 < f_{w(3+4)}/(f_w \cdot f_t)^{1/2} < 1.3 \quad (1)$$

$$0.9 < f_5/(f_w \cdot f_t)^{1/2} < 1.1 \quad (2)$$

$$0.3 < |f_2|/(f_w \cdot f_t)^{1/2} < 0.4 \quad (3)$$

wherein $f_{w(3+4)}$ is combined focal length of the third and fourth lens groups at a wide angle end thereof, $f_w$ is focal length of said zoom lens as a whole system at the wide angle end, $f_t$ is focal length of said zoom lens as a whole system at a telephotographic end thereof, $f_5$ is focal length of the fifth lens group, and $f_2$ is focal length of the second lens group.

2. A zoom lens according to claim 1, wherein at least one lens comprised within said third lens group has a positive refractive power and satisfies the following conditional expressions (4) and (5):

$$\nu_d > 80 \quad (4)$$

$$\theta_{g,F} > 0.53 \quad (5)$$

wherein $\nu_d$ is Abbe number at d-line and $\theta_{g,F}$ is relative partial dispersion: $(n_g - n_F)/(n_F - n_c)$ where $n_g$, $n_F$, and $n_c$ are the refractive indices for the g, F, and c lines respectively.

3. A zoom lens according to claim 1, wherein at least one lens comprised within said fifth lens group has a positive refractive power and satisfies the following conditional expressions (6) and (7)

$$\nu_d > 65 \quad (6)$$

$$\theta_{g,F} > 0.53 \quad (7)$$

wherein $\nu_d$ is Abbe number at d-line and $\theta_{g,F}$ is relative partial dispersion: $(n_g - n_F)/(n_F - n_c)$ where $n_g$, $n_F$, and $n_c$ are the refractive indices for the g, F, and c lines respectively.

4. A zoom lens according to claim 1, wherein at least one lens surface of a lens comprised within said third lens group is formed of an aspheric surface.

* * * * *